United States Patent
Koskela et al.

(10) Patent No.: US 12,003,985 B2
(45) Date of Patent: Jun. 4, 2024

(54) CARRIER MEASUREMENTS

(71) Applicant: Nokia Technologies Oy, Espoo (FI)

(72) Inventors: Jarkko Koskela, Oulu (FI); Tero Henttonen, Espoo (FI); Elena Virtej, Espoo (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 462 days.

(21) Appl. No.: 17/294,662

(22) PCT Filed: Oct. 22, 2019

(86) PCT No.: PCT/FI2019/050746
§ 371 (c)(1),
(2) Date: May 17, 2021

(87) PCT Pub. No.: WO2020/109651
PCT Pub. Date: Jun. 4, 2020

(65) Prior Publication Data
US 2021/0409982 A1 Dec. 30, 2021

Related U.S. Application Data

(60) Provisional application No. 62/772,771, filed on Nov. 29, 2018.

(51) Int. Cl.
*H04W 24/08* (2009.01)
*H04W 24/10* (2009.01)
*H04W 76/27* (2018.01)

(52) U.S. Cl.
CPC ........... *H04W 24/08* (2013.01); *H04W 24/10* (2013.01); *H04W 76/27* (2018.02)

(58) Field of Classification Search
CPC ..... H04W 24/08; H04W 24/10; H04W 76/27; H04W 76/15
See application file for complete search history.

(56) References Cited

U.S. PATENT DOCUMENTS

| | | | |
|---|---|---|---|
| 2018/0270682 A1* | 9/2018 | Zacharias | H04W 24/10 |
| 2019/0037425 A1* | 1/2019 | Hong | H04W 72/23 |
| 2021/0120447 A1* | 4/2021 | Zhou | H04W 24/10 |

FOREIGN PATENT DOCUMENTS

| | | |
|---|---|---|
| WO | 2018/054475 A1 | 3/2018 |
| WO | 2018/205387 A1 | 11/2018 |

OTHER PUBLICATIONS

"New WID on DC and CA enhancements (NR_DCCA_Enh)", 3GPP TSG-RAN#80, RP-181469, Agenda : 9.2.2, Ericsson, Jun. 11-14, 2018, 5 pages.
"New WID on Enhancing CA Utilization", 3GPP TSG RAN Meeting #75, RP-170805, Agenda : 10.1.2, Nokia, Mar. 6-9, 2017, 4 pages.

(Continued)

*Primary Examiner* — Rina C Pancholi
(74) *Attorney, Agent, or Firm* — Lippes Mathias LLP (57) ABSTRACT

There is provided a method at a user equipment, the method comprising: entering a radio resource control, RRC, inactive mode; determining which carriers are to be measured during the RRC inactive mode; performing measurements of the determined carriers during the RRC inactive mode; providing the results of the measurements to a network upon entering an RRC connected mode.

13 Claims, 5 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.3.0, Sep. 2018, pp. 1-358.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.3.0, Sep. 2018, pp. 1-918.

"Finalizing IDLE Mode Measurements for euCA", 3GPP TSG-RAN WG2 Meeting #102, R2-1806772, Agenda : 9.9.2, Nokia, May 21-25, 2018, 7 pages.

"LS on Final RAN2 Agreements for euCA", 3GPP TSG-RAN WG2 #102, R2-1809271, TSG RAN WG2, May 21-25, 2018, pp. 1-2.

International Search Report and Written Opinion received for corresponding Patent Cooperation Treaty Application No. PCT/FI2019/050746, dated Jan. 21, 2020, 14 pages.

Extended European Search Report received for corresponding European Patent Application No. 19890188.6, dated Jul. 8, 2022, 12 pages.

"Fast SCell Configuration through Quick SCell Measurement Reporting", 3GPP TSG-RAN2 Meeting #101bis, R2-1804546, Agenda : 9.9.2, Qualcomm Incorporated, Apr. 16-20, 2018, 7 pages.

"SIB5 reporting for Idle Mode CA Measurement", 3GPP TSG-RAN WG4 Meeting #89, R4-1815599, Agenda : 6.9.1.1, Ericsson, Nov. 12-16, 2018, 4 pages.

"Miscellaneous clarifications to euCA", 3GPP TSG-RAN WG2 Meeting #103bis, R2-1813767, Agenda : 9.9.2, Nokia, Oct. 8-12, 2018, 3 pages.

* cited by examiner

300 ACQUIRE FROM THE NETWORK A CONFIGURATION FOR AT LEAST ONE SECONDARY CARRIER

↓

302 MAINTAIN AT LEAST PART OF THE CONFIGURATION DURING THE INACTIVE MODE

↙ ↘

304A DETERMINE TO MEASURE ALL OF THE CARRIERS INDICATED IN THE CONFIGURATION

304B DETERMINE TO MEASURE A SUBSET OF THE CARRIERS INDICATED IN THE CONFIGURATION

FIG. 4

| CELL OR CARRIER ID | FREQ. | BW | RA | CA/DC APPLIC. | MEASURE IN INACTIVE |
|---|---|---|---|---|---|
| CELL #0 | | | | 1 | 1 |
| CELL #1 | | | | 1 | 0 |
| CELL #2 | | | | 1 | 1 |
| ⋮ | | | | ⋮ | ⋮ |
| CELL #N-1 | | | | 1 | 1 |
| CELL #N | | | | 0 | 0 |

| CELL OR CARRIER ID | ... | CA/DC APPLIC. | MEASURE IN INACTIVE | VALIDITY DURAT. | VALIDITY AREA |
|---|---|---|---|---|---|
| CELL #0 | | 1 | 1 | X | A |
| CELL #1 | | 1 | 0 | X | B |
| CELL #2 | | 1 | 1 | Y | B |
| ⋮ | | ⋮ | ⋮ | ⋮ | ⋮ |
| CELL #N-1 | | 1 | 1 | X | A |
| CELL #N | | 0 | 0 | Z | C |

FIG. 5

600 INCLUDE INFORMATION IN A CONFIGURATION FOR SCELLS, THE INFORMATION INDICATING FOR AT LEAST SOME OF THE CELLS OF THE CONFIGURATION WHETHER OR NOT THE CORRESPONDING CARRIER IS TO BE MEASURED DURING RRC INACTIVE MODE OR NOT

602 PROVIDE CONFIGURATION TO UE

604 RECEIVE RESULTS OF CARRIER MEASUREMENTS FROM THE UE UPON THE UE ENTERING FROM RRC INACTIVE TO RRC CONNECTED MODE

606 APPLY THE RECEIVED MEASUREMENT RESULTS IN TRIGGERING MULTICARRIER CONNECTIVITY FOR THE UE

CARRIER MEASUREMENTS

RELATED APPLICATION

This application was originally filed as a Patent Cooperation Treaty Application No. PCT/FI2019/050746 filed on Oct. 22, 2019, which claim priority from U.S. Provisional Patent Application No. 62/772,771 filed on Nov. 29, 2018, which is hereby incorporated in its entirety.

TECHNICAL FIELD

Various example embodiments relate generally to carrier measurements.

BACKGROUND

Carrier aggregation (CA) or dual connectivity (DC) may be applied to enhance user experience in wireless communications. It is beneficial to set up such multicarrier connectivity as fast as possible.

BRIEF DESCRIPTION

According some aspects, there is provided the subject matter of the independent claims. Some further aspects are defined in the dependent claims. The embodiments or aspects that do not fall under the scope of the claims are to be interpreted as examples useful for understanding the disclosure

LIST OF THE DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wide-band-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN).

The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integratable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

For 5G networks, it is envisaged that the architecture may be based on a so-called CU-DU (central unit-distributed unit) split, where one gNB-CU controls several gNB-DUs. The term 'gNB' may correspond in 5G to the eNB in LTE. The gNBs (one or more) may communicate with one or more UEs 120. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

Figure 1:
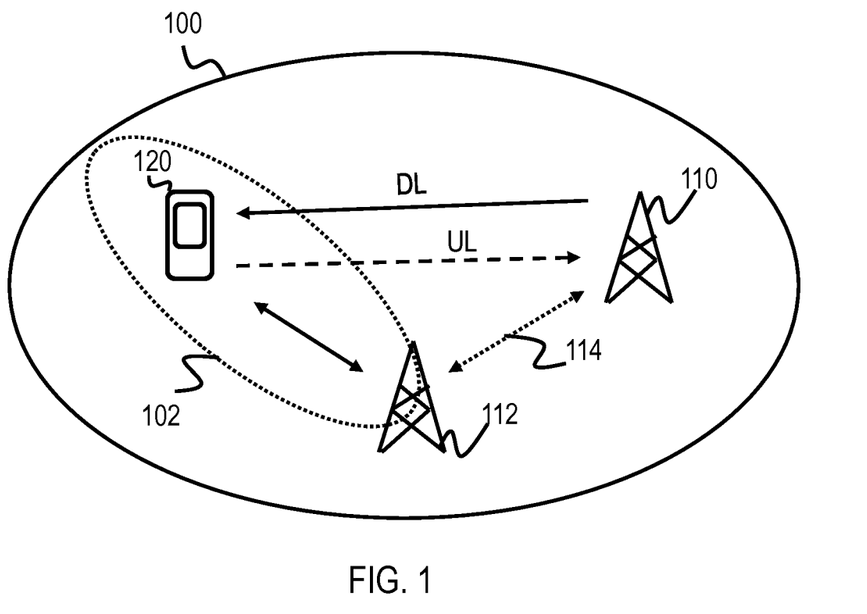
FIG. 1 presents a communication network, according to an embodiment.

FIG. 1 illustrates an example of a communication system to which embodiments of the invention may be applied. The system may comprise a control node 110 providing a cell 100. Each cell may be, e.g., a macro cell, a micro cell, femto, or a pico cell, for example. In another point of view, the cell may define a coverage area or a service area of the access node 110. The control node 110 may be an evolved Node B (eNB) as in the LTE and LTE-A, ng-eNB as in eLTE, gNB of 5G, or any other apparatus capable of controlling radio communication and managing radio resources within a cell. The control node 110 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node 110 to the UE 120 and uplink (UL) communication from the UE 120 to the control node 110.

Additionally, one or more local area access nodes 112 may be arranged such that a cell 112 provided by the local area access node at least partially overlaps the cell 100 of the macro cell access node 110. The local area access node may provide wireless access within a sub-cell that may be comprised within a macro cell 100. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node 112 may be likewise called a base station, network node, or an access node. The cell 102 need not be a micro, pico and/or femto cell, but may be a macro cell as well.

The UE typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, vehicular device, and multimedia device.

In the case of multiple access nodes in the communication network, the access nodes may be connected to each other with an interface 114. LTE specifications call such an interface as X2 interface. For IEEE 802.11 network (i.e. wireless local area network, WLAN, WiFi), a similar interface Xw may be provided between access points. An interface between an eLTE access point and a 5G access point may be called Xn. Other communication methods between the access nodes may also be possible. The access node 110 may be further connected via another interface to a core network of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and the core network may comprise an advanced mobility management entity (AMF) and a gateway node. The AMF may handle mobility of terminal devices in a tracking area encompassing a plurality of cells and handle signalling connections between the terminal devices and the core network. The gateway node may handle data routing in the core network and to/from the terminal devices.

A technique called carrier aggregation (CA) may be used to increase the band-width, and thereby increase the bitrate. Each aggregated carrier is referred to as a component carrier (CC). The individual component carriers can also be of different bandwidths. One way to arrange aggregation is to use contiguous component carriers within the same operating frequency band, so called intra-band contiguous. Alternatively, a non-contiguous allocation it could either be intra-band, i.e. the component carriers belong to the same operating frequency band, but have a gap, or gaps, in between, or it could be inter-band, in which case the component carriers belong to different operating frequency bands. When carrier aggregation is used there may be a number of serving cells, one for each component carrier. The coverage of the serving cells may differ, for example due to that CCs on different frequency bands will experience different pathloss. The RRC connection may be handled only by one cell, the Primary serving cell (PCell) providing the primary component carrier (PCC). The other component carriers may be referred to as secondary component carriers (SCC), serving the secondary serving cells (SCells). There may be one or more SCells. One of those may be primary secondary cell (PSCell). CA may origin from the same eNB/gNB, but it may have utilize intra-site CA (collocated) or inter-site CA (not-collocated remote radio heads (RRH)). CA may have a single scheduler for the aggregated carriers. The backhaul delay may be considered ideal. There may be no definition of which carrier should be used as a primary component carrier—different terminals may use different carriers. The configuration of the primary component carrier may be terminal specific and may be determined according to the loading on the various carriers as well as other criteria.

While CA was introduced in 3GPP to allow a UE to simultaneous transmit and receive data on multiple component carriers, a dual connectivity (DC) was introduced in 3GPP to allow a UE to simultaneously transmit and receive data on multiple component carriers from two cell groups (master cell group, MCG, and secondary cell group, SCG) via a master eNB (MeNB) and a secondary eNB (SeNB). DC may have two independent schedulers, with the two eNBs/gNBs communicating through a potentially non-ideal backhaul link between them (such as X2, typically having some delay). Dual connectivity may also be established among different RATs, e.g. with LTE and NR (5G), or among heterogenous networks with macro and femto cells. I.e. dual connectivity allows for inter-site radio resource aggregation.

In the following, the PCell of the CA and/or the MCG/MeNB of the DC are commonly denoted with the term primary cell (PCell), while any of the SCell(s) of the CA and/or the SCG/SeNB of the DC are commonly denoted with the term (primary) secondary cell (PSCell/SCell). In the following, term multicarrier connectivity is to be understood to cover both carrier aggregation and dual connectivity. One example of multicarrier connectivity is in FIG. 1 where both of the cells 100 and 102 (provided by the access nodes 110 and 112) are used to provide connection to the UE 120.

A work item for LTE on enhanced utilization of CA (euCA) specifies enhancements to reduce delays in SCell set-up for CA or DC (i.e. to set up multicarrier connectivity), including shorter SCell configuration delays after the UE moves from RRC idle to RRC connected mode. Related to this, the eNB may assign the UE to do measurements during RRC idle mode and to report the measurement results when the UE goes back to RRC connected mode. This allows the network to use the measurement results when the UE enters the RRC connected mode for fast CA set-up.

The indication for which carrier(s) the UE could do the idle mode measurements may in LTE be included in system information block 5 (SIB5) and/or in a dedicated RRC signalling (e.g. in an RRCConnectionRelease message sent by the network to the UE when the UE is to switch into RRC idle mode). E.g. if the UE receives the information about which carriers it may need to measure in idle in broadcast information the UE may measure and report measurements of those carriers where it can operate in CA/DC, i.e. the UE reports those carriers the UE physically supports in carrier aggregation with serving cell (UE capability restriction). The UE then indicates the availability of inter-frequency measurements in RRCConnectionSetupComplete or RRCConnectionResumeComplete-message. For example, signalling of SCell measurement information during IDLE mode may take place as part of UE information procedure (UEInformationRequest and UEInformationResponse messaging) after the RRC connection is established.

A similar approach could be adopted for a NR idle mode or in a NR inactive mode. Some characteristics of the inactive mode/state comprise maintenance of context information by the UE and the network when the UE moves from "RRC Connected" to "RRC Inactive", which is also known as "RRC connected inactive"-state. Furthermore, RRC inactive mode assumes UE controlled mobility and RAN-based paging. Consequently, what comes as one problem when considering euCA for NR is the way the inactive state is envisioned by the NR. There the UE is seen as active from a core network (CN) point of view, but as idle from a radio access network (RAN) point of view. In this case, paging is coming from an anchor gNB (which may be the access node to which the UE was connected to before leaving the RRC connected mode), not from the AMF/MME (as in LTE). Also, in the RRC inactive, UE context is kept both at the UE and at the RAN-level. The RRC inactive is seen more as a 'suspended' state of the UE at RAN level, because from CN point of view the UE is still active.

Thus, it remains unclear how euCA can be applied in an efficient manner in NR, especially in an inactive state, in order to activate multicarrier connectivity fast after the UE moves to RRC connected.

To at least partially tackle this problem, there is proposed a solution for enhancing multicarrier connectivity establishment for a UE switching from the RRC inactive mode to the RRC connected mode. This may be accomplished so that the network indicates to a NR UE which carriers/cells are needed to be measured while the UE is in the RRC inactive, for finding potential SCells/PSCells once moving back to RRC connected mode. The indication from the network may advantageously be performed by reusing existing RRC configuration that is retained while in the inactive mode. This may be done implicitly or explicitly, as will be described.

The proposed embodiments may provide for optimized signaling with less or no additional overhead. The NW may flexibly indicate the UE regarding which carriers to measure during the RRC inactive mode. In general, the number of carriers to be measured should be minimized, as the measurements cause overhead and energy consumption for the UE. Nevertheless, it may be important to measure all relevant carriers to speed up the configuration of functioning multicarrier connectivity once the UE is back in connected mode.

Figure 2:
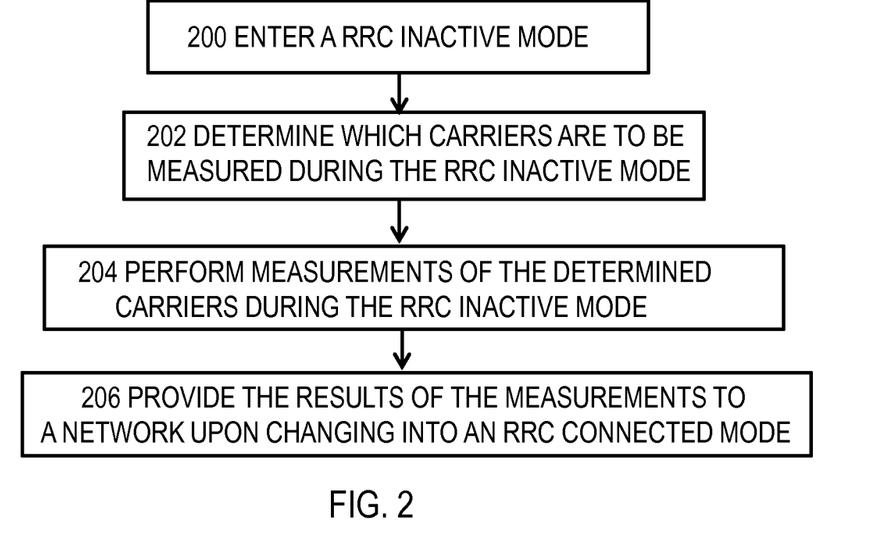
FIG. 2 shows a method, according to an embodiment.

FIG. 2 depicts an example method from the point of view of a user equipment. The method may be performed by a user equipment, such as the UE 120 of FIG. 1, for example.

Accordingly, as shown in FIG. 2, the UE may in step 200 enter the RRC inactive mode. The UE may have been in RRC connected mode and then the UE may have been caused to move to the RRC inactive mode. While in RRC connected, the UE may have applied single carrier connectivity with the PCell, or the UE may have applied multicarrier connectivity with the PCell and at least one SCell.

In step 202, the UE may determine which carriers are to be measured during the RRC inactive mode. This step will be described later in more details.

In step 204, the UE performs measurements of the determined carriers during the RRC inactive mode. The measurements may comprise e.g. signal quality level of the carriers, such as reference signal received power (RSRP), reference signal received quality (RSRQ), either SSB-based or CSI-RS-based (where SSB stands for synchronization signal block of NR and comprises e.g. primary and secondary synchronization signals (PSS and SSS) from which the UE may measure e.g. the RSRP, and CSI-RS stands for channel state information reference signal), or any other parameter indicating the level of the received radio signal like e.g. received signal strength indicator (RSSI) and/or signal to interference plus noise-ratio (SINR). The UE may thus perform the measurements and store the measurement results in the memory of the UE.

In step 206, the UE provides the results of the measurements to a network (e.g. to the node 110) upon changing into the RRC connected mode. The results may be provided e.g. in an RRCConnectionSetupComplete or a RRCConnectionResumeComplete-message, or the availability of such inter-frequency measurements may be provided in such a message, so that the network may request those.

Figure 3:
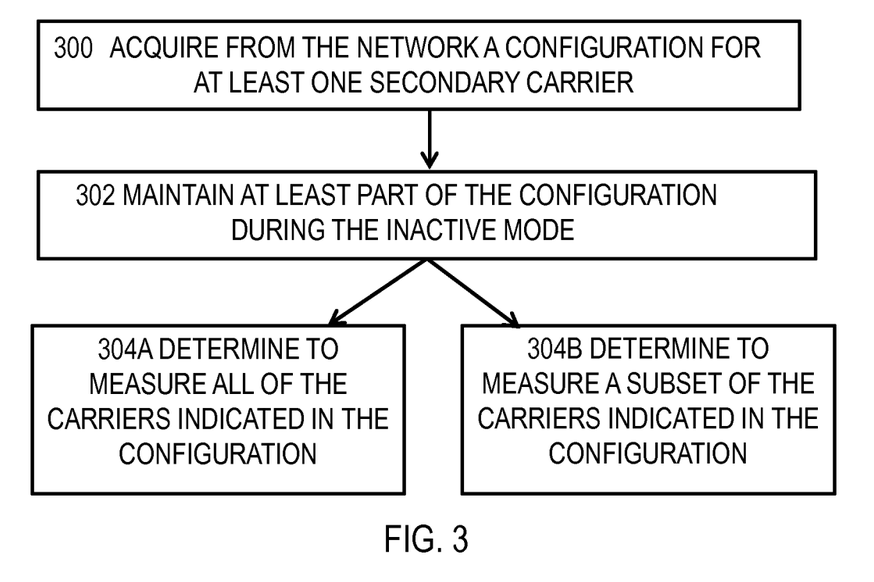
FIG. 3 shows a method, according to an embodiment.
Figure 4:
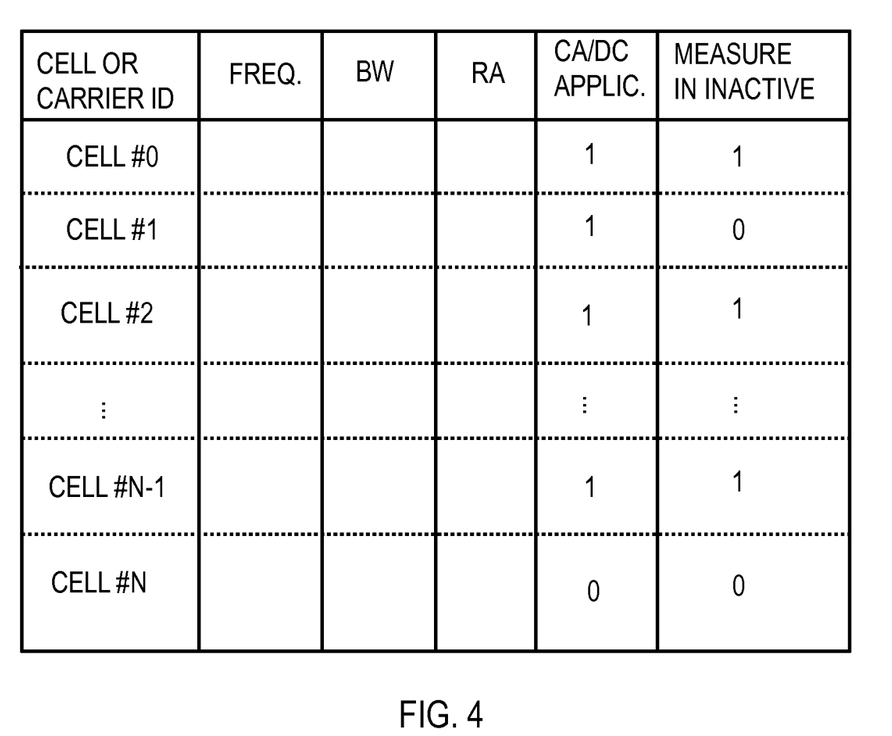
FIGS. 4 and 5 illustrate some example configurations, according to some embodiments.

Let us look at step 204 closer with respect to FIG. 3. In one embodiment, the UE acquires in step 300, from the network, a configuration for at least one secondary cell (SCell). In an embodiment, the configuration comprises configuration for a plurality of SCells. Each indicated SCell of the configuration may have a corresponding carrier which is identified by an ID. The UE may receive the configuration while the UE is in the RRC connected state (i.e. before switching into RRC inactive). In one embodiment, the configuration is e.g. a SCell configuration indicating information related to at least one SCell, i.e. a cell other than the serving cell, providing a secondary carrier (e.g. information about a carrier provided by the cell 102 of FIG. 1). The SCell configuration may also comprise information for the PSCell. In one embodiment, the UE may also receive configuration for a PCell (PCell configuration) indicating information related to the primary cell (e.g. cell 100 of FIG. 1), or the single configuration may comprise information of both the SCell(s) and the PCell. For example, the UE may reselect the serving cell to another layer from the former PCell. In that case it may be useful to also measure the former PCell carrier. In one embodiment, the configuration is a CA/DC configuration indicating the configuration of cells the UE uses/used for carrier aggregation or dual connectivity, e.g. which cells/carriers and e.g. related parameters the UE used for the multicarrier connectivity while in the connected mode or which SCells would have been applicable to be combined with the Pcell in case multicarrier connectivity had been established. An illustration of an example configuration is shown in FIG. 4, which will be discussed later.

Then, in step 302, the UE maintains at least part of the configuration during the inactive mode. That is, while the UE switches from the RRC connected mode to the RRC inactive mode, the UE stores the configuration at least partly. The UE may have received one or many configurations regarding the secondary cells/carriers while in the RRC connected mode. Each configuration may include several information elements. The UE may not need to store all, but only the relevant information elements needed for the measuring. Then, the UE may apply the maintained (part of the) configuration in determining (in step 202) which carriers are to be measured during the RRC inactive mode. As a further example, although the UE may have received a configuration for the PCell, the UE may not necessarily need to maintain that for the purposes of carrier measurement in inactive mode. E.g. when the PCell is on macro layer and measured for mobility purposes anyway, then it is possible that the inactive mode measurements based on the CA configuration are applied only on the SCells. So, the UE may have the configuration at least partially kept during switch to the RRC inactive state, and the kept part of the configuration is then used by the UE 120 to determine which carriers are required to be measured in the RRC inactive state.

In one embodiment, in step 304A all the carriers indicated in the configuration are to be measured. This can include, depending on the acquired configuration(s), all the SCell carriers including PSCell and SCells. In some embodiments, the carrier to be measured for this purpose may also include the PCell.

In another embodiment, shown in step 304B, only a subset of the carriers indicated in the configuration are to be measured. E.g. the subset may include only those carriers that that were activated within a predetermined time period before the UE entering the RRC inactive mode. I.e. the subset may include those carriers that had activated the corresponding SCell just recently before the connection was suspended/released. As another example, the subset may include only those carriers of the configuration that the UE had used for multipoint/multicarrier connectivity earlier. As yet another example, the subset may include only those carriers of the configuration that the UE knows are applicable to be combined in CA/DC with the current macro cell. E.g. it may be that the UE has moved out of the coverage area of the macro cell to a coverage area of another macro cell. Then, the configuration may not be fully valid for the new macro cell, but the UE may know (e.g. based on history data) that some of the carriers of the configuration are applicable to operate in CA/DC also with the current macro cell, while some of the carriers are not. Then the UE may decide to measure only those applicable carriers, instead of trying to measure all the carriers.

As such, steps 302, 304A, 304B represent some embodiments where the UE acquires information on which carriers to measure during the RRC inactive mode implicitly, by maintaining the UE context comprising the configuration of the at least one secondary cell/carrier and without a need to add information elements to the configuration or in general to the UE. Thus, one benefit of these embodiments is that no extra signalling may be needed for the UE to determine which carriers to measure.

Alternatively, in one embodiment, the indication of which carriers to measure may be done explicitly. One advantage related to the explicit indication is that instead of UE itself filtering out from a given measurement configuration, the network may indicate the carriers that need to be measured. That is, the network configures the UE to measure those carriers that the network wants the UE to measure (e.g. those ones with the best coverage).

Let us look at some embodiments related to explicit signaling in view of FIG. 4, which illustrates an example configuration indicating information for the at least one or more carrier(s)/cell(s). As shown, the configuration may include information such as frequencies, bandwidths, random access configurations, information needed to receive/transmit, etc. for the relevant PCell or SCell. The inputs for these particular fields in FIG. 4 are left empty, as the skilled person understands the concept. The configurations for the SCell(s) and, also for the PCell if needed, may be provided from the network to the UE while the UE is connected RRC mode. Different configurations (e.g. one for PCell and one for SCell(s)) may be sent with one message or in separate messages. Each SCell may operate on a specific carrier and configuration may implicitly indicate the UE to measure the specific carrier(s), at least if the corresponding bit/indication is present for that/those SCell(s)). An example explicit indication may take place, e.g. as shown in FIG. 4, wherein the configuration comprises information indicating for at least some of the carriers of the configuration whether or not the carrier is to be measured during the RRC inactive mode or not (see the right-most column of the configuration-table of FIG. 4). Alternatively, only carriers/cells to be measured are included in the list. This way, the determining of step 202 may be based on this explicit information comprised in the configuration. As an example, the information included in the configuration may comprise at least one of the following: an explicit indication for each carrier that is to be measured during the RRC inactive mode and an explicit indication for each carrier that is not to be measured during the RRC inactive mode. E.g. bit '0' may denote not to measure the carrier/cell corresponding to the cell/carrier ID and/or bit '1' may denote to measure the carrier/cell corresponding to the cell/carrier ID, or vice versa. Advantageously the existing configuration(s), such as SCG/SCell configuration or any other configuration listed above, may be reused for this purpose, which increases the signalling overhead minimally.

Some criteria used by the network to determine which carriers the UE should measure include alone or in combination:
- coverage of the carrier/cell (e.g. measure carriers which have a coverage area above a certain predetermined coverage threshold). As one example, only small cell (e.g. femto/pico) are to be measured. The threshold may be determined empirically or base don simulations, for example.
- carrier applicability (e.g. measure carriers that are available/operating also in the neighboring cells and/or on unlicensed bands).
- interference (e.g. measure carriers that have the interference/load below a predetermined interference/load threshold. The threshold may be determined empirically or base don simulations, for example.
- UE capabilities (e.g. measure carriers that are easiest to measure for the UE depending on its capabilities, e.g. measure carriers that do not need application of measurement gaps).
- Collocation of access nodes providing the cells/carriers (e.g. only one of the carriers of two collocated SCells are to be measured to reduce measurement effort).

The configuration may also comprise indication regarding which carrier/cell is applicable for the UE for CA/DC, i.e. regarding which carriers the UE physically supports (UE capability restriction), as shown with the second right-most column of FIG. 4. As shown there, the UE may support carriers [0, 1, 2, . . . , N−1], but not carrier N. Owing to the explicit indication of which carriers to measure, the UE may not be required to measure all of these, but e.g. only carriers [0, 2, N−1]. That is, the UE need not measure all carriers the UE can physically support but a restricted set of carriers. As an example, the UE may be indicated to measure only those carriers the network has best coverage and/or lowest load.

Yet one embodiment related to explicit signalling is that the UE receives, from the network, a state transition message comprising information indicating which carriers are to be measured during the RRC inactive mode. The UE may then use this information as a basis for the determination of step 202. As an example, the network may include in the state transition message (e.g. in RRCSuspend in NR) an indication to the configuration (e.g. to the SCell/SCG configuration). The information may comprise e.g. SCellIndex(es) whose carriers should be measured (or the opposite i.e. which ones not to measure). Alternatively, in an embodiment, a bitmap pointing to SCellIndexes (for example first bit—cell #0, second bit—cell #1, etc.) can be provided to the UE, where bit '0' may denote not to measure the carrier/cell corresponding to the index and bit '1' may denote to measure the carrier/cell corresponding to the index. In an embodiment, for example two separate lists/bitmaps as explained above are provided to the UE by the network (e.g. by the gNB): one for MCG and one for SCG. This explicit indication in the state transition message may resemble the indication of the right-most column of FIG. 4.

In one embodiment, the UE may acquire information of a validity duration indicating how long the determination of which carriers are to be measured during the RRC inactive mode is valid. It needs to be noted that the UE may remain in the RRC inactive mode for a period of time, and the configuration maintained or RRC state transition message may indicate how long each carrier should be measured. I.e. The UE may be provided with information for how long this measurement configuration is valid i.e. how long does the UE apply it. In an embodiment, the validity duration is indicated with a timer having certain expiration duration.

Figure 5:
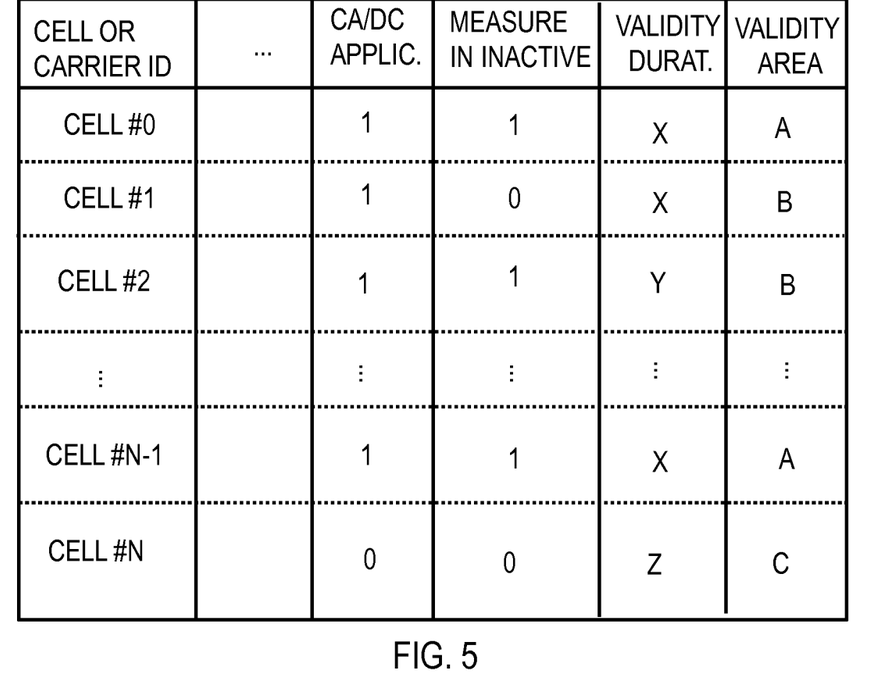

In an embodiment, the validity duration may be a single timer value defining the validity period for all carriers in the configuration or in the state transition message. However, in another embodiment, the validity duration is indicated separately for each carrier that is to be measured (e.g. the timer is per carrier), wherein at least two carriers to be measured have different validity durations. This is shown in FIG. 5 which depict the similar configuration as that of FIG. 4, but FIG. 5 includes one or two new columns. According to the embodiment, the second right-most column of the configuration of FIG. 5 indicates the validity duration for each carrier. As shown, some of the values may have the same value ('X') while some other carriers have different values (e.g. 'Y' or 'Z'). I.e. the validity duration may be different for different carriers. After the timer period 'Z' has passed or expired, the measurement of the carrier having an index #N need not be performed anymore, for example. In an embodiment, the validity duration may define that the measurement of the carriers in the RRC inactive mode according to the configuration or according to the state transition message is valid only once upon trying to make a connection or upon a successful connection to the network.

In one embodiment, illustrated in FIG. 5, the UE may acquire information of a validity area indicating a geographical area within which the determination of which carriers to be measured during the RRC inactive mode is valid. As for the validity duration, the indication of validity area may be a single value defining the validity area for all carriers or the validity area may be indicated separately for each carrier that is to be measured. FIG. 5 shows this with the right-most column having areas 'A', 'B' or 'C' for the carriers. Each of these values 'A', 'B' or 'C' may define e.g. a tracking area and/or a list of cells, RAN areas, tracking areas. In another embodiment, the validity area may define that if the UE moves out of a current cell (e.g. cell-reselection done), the measurement configuration is invalidated.

In an embodiment, the UE at some point returns to RRC connected mode. Then, as stated in step 206, the UE may avail the measurement results to the network. The network may apply the received measurement results in triggering carrier aggregation (or in general, multicarrier connectivity) for the user equipment. That is, the UE 120 may apply multicarrier connectivity for communication with the network after changing into the RRC connected mode, wherein carriers utilized in the multicarrier connectivity are determined based on the provided results of the measurements.

Figure 6:
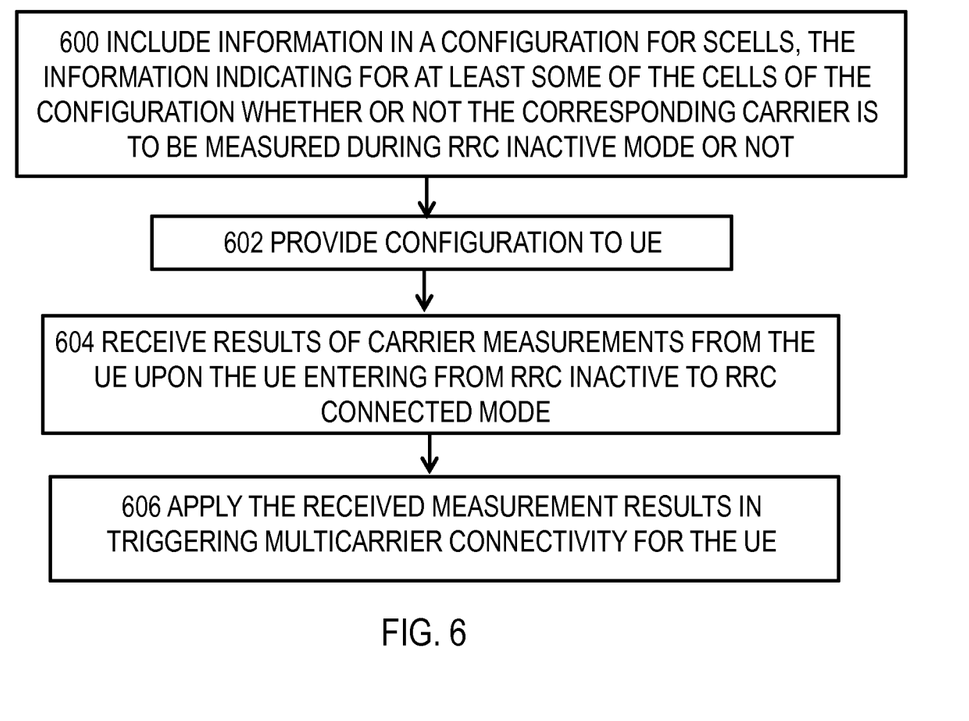
FIG. 6 depicts a method, according to an embodiment.

FIG. 6 depicts an example method from the point of view of the network node. The method may be performed by a network access node, such as the gNB 110 of FIG. 1, for example. Accordingly, as shown in FIG. 6, the access node may in step 600 include information in the configuration for a plurality of secondary cells, the information indicating for at least some of the cells of the configuration whether or not the corresponding carrier is to be measured during the RRC inactive mode or not. As indicated above, the configuration may be e.g. SCell configuration, SCG configuration, CA/DC configuration, to mention only a few examples. In step 602, the configuration is provided to the UE (e.g. the UE 120). In step 604, the network receives results of carrier measurements from the user equipment upon the UE entering from the RRC inactive more to the RRC connected mode, wherein the UE is configured to perform the carrier measurements during the RRC inactive mode according to the information comprised in the configuration. Then, in step 606, the access node may apply the received measurement results in triggering multicarrier connectivity, such as CA, for the UE.

In some embodiments, as indicated in connection of FIG. 5, the network node may also provide the UE with information indicating a validity duration indicating how long the configuration of which carriers are to be measured during the RRC inactive mode is valid. In some embodiments, as indicated in connection of FIG. 5, the network node may also provide the UE with information indicating a validity area indicating a geographical area within which the configuration of which carriers are to be measured during the RRC inactive mode is valid. This duration (e.g. timer) and/or area may be per carrier or a single timer common to all carriers. These pieces of information (either or both) may be provided in the configuration of FIG. 5, which the UE at least partially maintains upon entering the RRC inactive mode, or in the state transition message sent by the network when the UE is to enter the RRC inactive mode.

Figure 7:
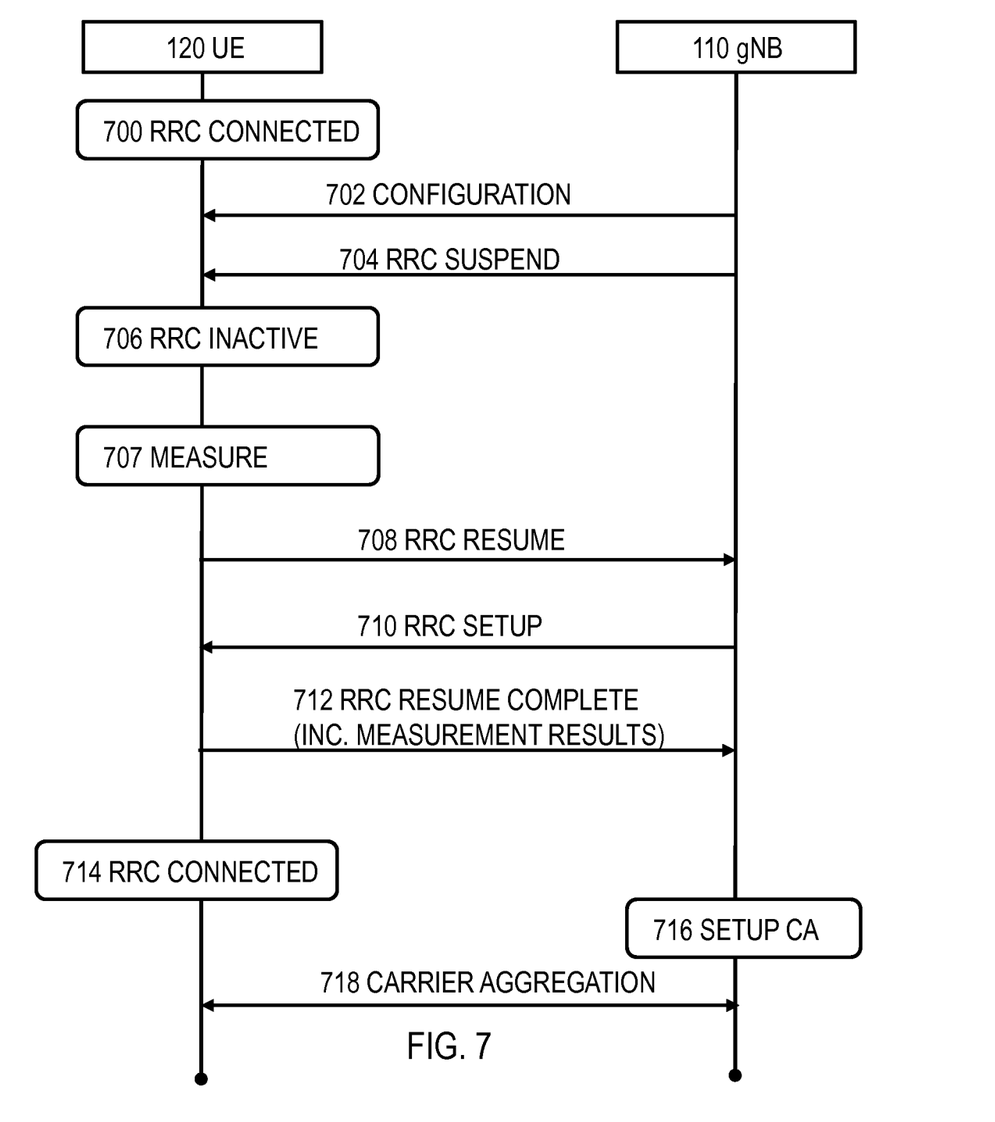
FIG. 7 illustrates a signaling flow diagram, according to an embodiment.

An example signaling flow diagram according to some embodiments is illustrated in FIG. 7. In step 700, the UE 120 is in RRC connected mode. That is, the UE is in connected mode from the point of view of the RAN and from the point of view of the CN.

In step 702, the UE receives at least one configuration for at least one secondary cell (e.g. information of SCell(s) and of secondary component carrier(s), SCC) from the network 110. The configuration may be any of the types discussed earlier. As a result, the UE may be configured with at least one SCell (e.g. from MCG and/or from SCG) and with at least one PCell. There may also be one or more SCells in the SCG as well. In one embodiment the configuration may carry an indication of the carriers to be measured during the RRC inactive mode (see e.g. FIG. 4).

In step 704 the network may decide to move the UE to the RRC inactive mode. This may happen by sending an RRC suspend message to the UE. In one embodiment this message may carry an indication of the carriers to be measured during the RRC inactive mode. In one embodiment this message may carry an indication the validity duration and/or validity area, as explained above.

Consequently, in step 706, the UE enters the RRC inactive mode. In this mode, the UE is in connected/active mode from the point of view of the CN but in idle mode from the point of view of the RAN.

In step 707, the UE measures the carriers that are determined to be measured according to any of the embodiments. The UE may take any possible indicated validation parameters into account while determining which carriers to measure.

In step 708, the UE determines that connection to RAN needs to be resumed by entering RRC connected mode. This may happen e.g. due to paging from the network or due to the UL buffer of the UE having data to be transmitted to the network. Consequently, the UE may transmit an RRC resume message to the gNB, which may be the same or different than the gNB with which the UE earlier had a connection with in step 700.

In step 710, the network responds with RRC setup message which the UE may use to setup the connection and then in step 712 to send the RRC resume complete-message to the network. This message may comprise the results of the measurements or at least an indication of availability of the such measurements. In step 714 the UE is back in RRC connected mode.

In step 716, the access node may apply the received measurement results in triggering multicarrier connectivity, such as CA in step 718, for the UE. If the RRC resume complete does not include the results, the access node 110 may request those based on the indication of availability.

Even though the description is written such that the UE is in the RRC inactive mode, some embodiments are applicable also when the UE is in idle mode. There, for example, the state transition message from the network may indicate to an UE (which is about the enter idle mode) which carriers to measure in the idle mode. When the connection is re-established, the UE may avail the carrier measurements performed in the idle mode to the network, so that the network can fast setup multicarrier connectivity for the UE.

Figure 8:
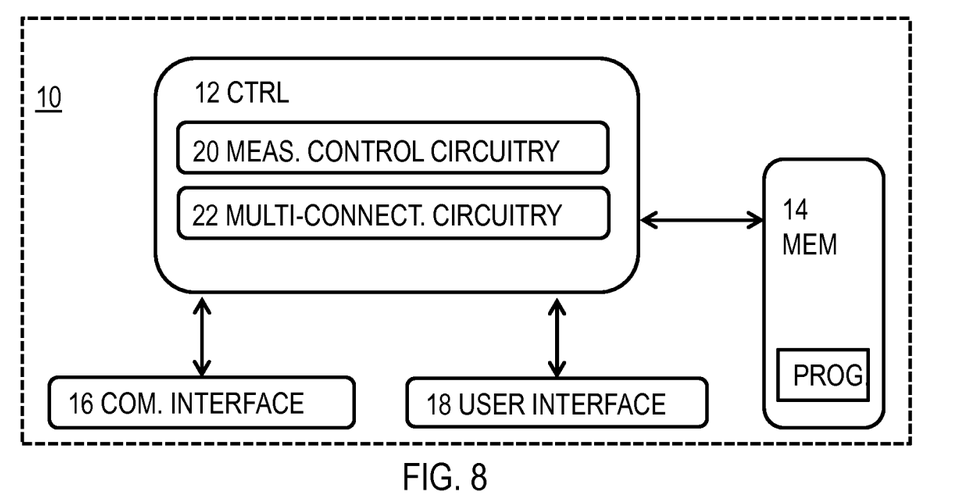
FIGS. 8 and 9 illustrate apparatus, according to some embodiments.

An embodiment, as shown in FIG. 8, provides an apparatus 10 comprising a control circuitry (CTRL) 12, such as at least one processor, and at least one memory 14 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor based memory devices, flash memory, magnetic memory devices and systems, optical memory devices and systems, fixed memory and removable memory.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 50 is or is comprised in the UE 120. The apparatus may be caused to execute the functionalities of some of the above described processes, such as the steps of FIG. 2.

The apparatus may further comprise communication interface (TRX) 16 comprising hardware and/or software for realizing communication connectivity according to one or more communication protocols. The TRX may provide the apparatus with communication capabilities to access the radio access network, for example. The apparatus may also comprise a user interface 18 comprising, for example, at least one keypad, a microphone, a touch display, a display, a speaker, etc. The user interface may be used to control the apparatus by the user.

The control circuitry 12 may comprise a measurement control circuitry 20 for controlling the measurement of carriers (e.g. which carriers to measure and which parameters to measure) during the RRC inactive mode, according to any of the embodiments. The control circuitry 12 may further comprise a multi-connectivity circuitry 62 for managing multicarrier connectivity, e.g. carrier aggregation, according to any of the embodiments.

Figure 9:
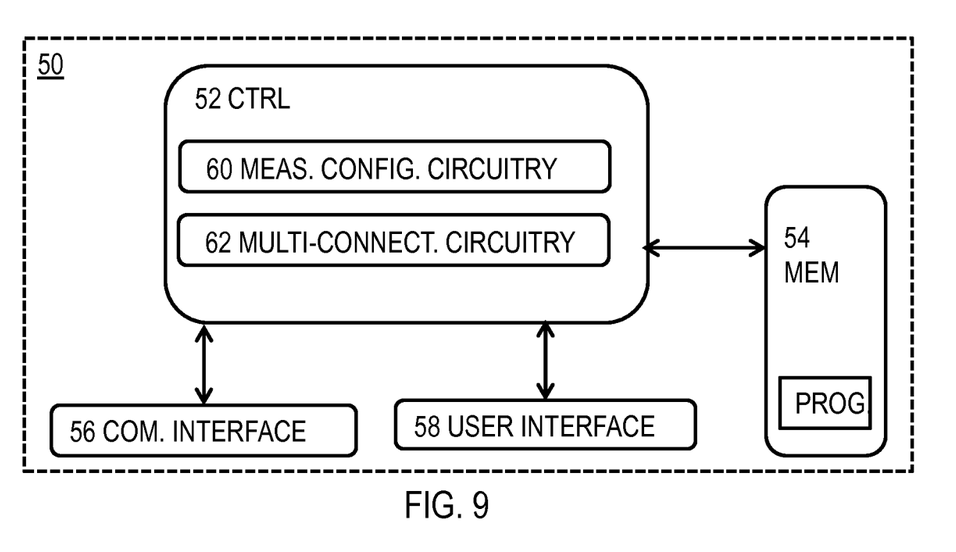

An embodiment, as shown in FIG. 9, provides an apparatus 50 comprising a control circuitry (CTRL) 52, such as at least one processor, and at least one memory 54 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory.

In an embodiment, the apparatus 50 may be or be comprised in a network node, such as in gNB/gNB-CU/gNB-DU of 5G. In an embodiment, the apparatus 50 is or is comprised in the network node 110. The apparatus may be caused to execute the functionalities of some of the above described processes, such as the steps of FIG. 6.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus 50 may be instead comprised in the distributed unit, and at least some of the described processes may be performed by the distributed unit.

In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 10 controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access network, for example. The apparatus may also comprise a user interface 58 comprising, for example, at least one keypad, a microphone, a touch display, a display, a speaker, etc. The user interface may be used to control the apparatus by the user.

The control circuitry 52 may comprise a measurement configuration circuitry 60 for controlling and configuring which carriers the UE should measure during the RRC inactive mode, according to any of the embodiments. The control circuitry 12 may comprise a multi-connectivity circuitry 62 e.g. for setting up multicarrier connectivity for the UE based on the received carrier measurements, according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided an apparatus, comprising at least one processor and at least one memory including a computer program code, wherein the at least one memory and the computer program code are configured, with the at least one processor, to cause the apparatus to: enter a radio resource control, RRC, inactive mode; determine which carriers are to be measured during the RRC inactive mode; perform measurements of the determined carriers during the RRC inactive mode; provide the results of the measurements to a network upon entering an RRC connected mode.

Various embodiments of the first aspect may comprise at least one feature from the following bulleted list:

- acquiring from the network a configuration for at least one secondary cell; maintaining at least part of the configuration during the inactive mode; determining which carriers are to be measured during the RRC inactive mode based on the configuration.
- wherein all carriers indicated in the configuration are to be measured.
- wherein only a subset of the carriers indicated in the configuration are to be measured.
- wherein the subset includes those carriers that were activated within a predetermined duration before the entering the RRC inactive mode.
- wherein the configuration comprises information indicating for at least some of the secondary cells of the configuration whether or not the corresponding carrier is to be measured during the RRC inactive mode or not, and wherein the determining is based on the information.
- wherein the information comprises at least one of the following: an explicit indication for each carrier that is to be measured during the RRC inactive mode and an explicit indication for each carrier that is not to be measured during the RRC inactive mode.
- receiving a state transition message from the network, the message comprising information indicating which carriers are to be measured during the RRC inactive mode, and wherein the determining is based on the information.
- acquiring information of a validity duration indicating how long the determination of which carriers are to be measured during the RRC inactive mode is valid.
- wherein the validity duration is indicated separately for each carrier that is to be measured, wherein at least two carriers to be measured have different validity durations.
- acquiring information of a validity area indicating a geographical area within which the determination of which carriers to be measured during the RRC inactive mode is valid.
- entering the RRC connected mode; apply multicarrier connectivity for communication with the network after entering the RRC connected mode, wherein carriers utilized in the multicarrier connectivity are determined based on the provided results of the measurements.
- wherein the RRC connected mode is with a New Radio, NR, communication network and the apparatus is a user equipment operable at least in the NR communication network According to a second aspect, there is provided an apparatus, comprising at least one processor and at least one memory including a computer program code, wherein the at least one memory and the computer program code are configured, with the at least one processor, to cause the apparatus to: include information in a configuration of a plurality of secondary cells, the information indicating for at least some of the cells of the configuration whether or not the corresponding carrier is to be measured by a user equipment during a radio resource control, RRC, inactive mode or not; provide the configuration to the user equipment; receive results of carrier measurements from the user equipment upon the user equipment entering from the RRC inactive more to a RRC connected mode, wherein the user equipment is configured to perform the carrier measurements during the RRC inactive mode according to the information comprised in the configuration; apply the received measurement results in triggering multicarrier connectivity for the user equipment.

Various embodiments of the second aspect may comprise at least one feature from the following bulleted list:

- providing the user equipment with information indicating at least one of the following: a validity duration indicating how long the configuration of which carriers are to be measured during the RRC inactive mode is valid, and a validity area indicating a geographical area within which the configuration of which carriers are to be measured during the RRC inactive mode is valid.

According to a third aspect, there is provided a method, comprising: entering a radio resource control, RRC, inactive mode; determining which carriers are to be measured during the RRC inactive mode; performing measurements of the determined carriers during the RRC inactive mode; providing the results of the measurements to a network upon entering an RRC connected mode.

Various embodiments of the third aspect may comprise at least one feature from the bulleted list under the first aspect.

According to a fourth aspect, there is provided a method, comprising: including information in a configuration of a plurality of secondary cells, the information indicating for at least some of the cells of the configuration whether or not the corresponding carrier is to be measured by a user equipment during a radio resource control, RRC, inactive mode or not; providing the configuration to the user equipment; receiving results of carrier measurements from the user equipment upon the user equipment entering from the RRC inactive more to a RRC connected mode, wherein the user equipment is configured to perform the carrier measurements during the RRC inactive mode according to the information comprised in the configuration; applying the received measurement results in triggering multicarrier connectivity for the user equipment.

Various embodiments of the fourth aspect may comprise at least one feature from the bulleted list under the second aspect.

According to a fifth aspect, there is provided an apparatus, comprising means for performing the method according to the third aspect, and/or means configured to cause a user equipment to perform the method according to the third aspect. Various embodiments of the fifth aspect may comprise at least one feature from the bulleted list under the first aspect.

According to a sixth aspect, there is provided an apparatus, comprising means for performing the method according to according to the fourth aspect, and/or means configured to cause a user equipment to perform the method according to the fourth aspect. Various embodiments of the sixth aspect may comprise at least one feature from the bulleted list under the second aspect.

According to a seventh aspect, there is provided a computer program product embodied on a distribution medium readable by a computer and comprising program instructions which, when loaded into an apparatus, execute the method according to the third aspect. Various embodiments of the seventh aspect may comprise at least one feature from the bulleted list under the first aspect.

According to an eight aspect, there is provided a computer program product embodied on a distribution medium readable by a computer and comprising program instructions which, when loaded into an apparatus, execute the method according to the fourth aspect. Various embodiments of the eight aspect may comprise at least one feature from the bulleted list under the second aspect.

According to a ninth aspect, there is provided a computer program product comprising program instructions which, when loaded into an apparatus, execute the method according to the third aspect. Various embodiments of the ninth aspect may comprise at least one feature from the bulleted list under the first aspect.

According to a tenth aspect, there is provided a computer program product comprising program instructions which, when loaded into an apparatus, execute the method according to the fourth aspect. Various embodiments of the tenth aspect may comprise at least one feature from the bulleted list under the second aspect.

According to an eleventh aspect, there is provided a computer system, comprising one or more processors; at least one data storage, and one or more computer program instructions to be executed by the one or more processors in association with the at least one data storage for carrying out a process according to any of aspects three to four.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor and at least one memory including a computer program code, wherein the at least one memory and the computer program code are configured, with the at least one processor, to cause the apparatus to:
   acquire from a network a configuration for at least one secondary cell;
   enter a radio resource control, RRC, inactive mode;
   maintain at least part of the configuration during the inactive mode;
   determine, based on the configuration, which carriers are to be measured during the RRC inactive mode;
   perform measurements of the determined carriers during the RRC inactive mode;
   provide the results of the measurements to the network upon entering an RRC connected mode,
   wherein only a subset of the carriers indicated in the configuration are to be measured, and
   wherein the subset includes those carriers that were activated within a predetermined duration before the entering the RRC inactive mode.

2. The apparatus of claim 1, wherein the configuration comprises information indicating for at least some of the secondary cells of the configuration whether or not the corresponding carrier is to be measured during the RRC inactive mode, and wherein the determining is based on the information.

3. The apparatus of claim 2, wherein the information comprises at least one of the following: an explicit indication for each carrier that is to be measured during the RRC inactive mode and an explicit indication for each carrier that is not to be measured during the RRC inactive mode.

4. The apparatus of claim 1, wherein the at least one memory and the computer program code are configured, with the at least one processor, to cause the apparatus further to:
   receive a state transition message from the network, the message comprising information indicating the configuration.

5. The apparatus of claim 1, wherein the at least one memory and the computer program code are configured, with the at least one processor, to cause the apparatus further to:
   acquire information of a validity duration indicating how long the determination of which carriers are to be measured during the RRC inactive mode is valid.

6. The apparatus of claim 5, wherein the validity duration is indicated separately for each carrier that is to be measured, wherein at least two carriers to be measured have different validity durations.

7. The apparatus of claim 1, wherein the at least one memory and the computer program code are configured, with the at least one processor, to cause the apparatus further to:
   acquire information of a validity area indicating a geographical area within which the determination of which carriers to be measured during the RRC inactive mode is valid.

8. The apparatus of claim 1, wherein the at least one memory and the computer program code are configured, with the at least one processor, to cause the apparatus further to:
   enter the RRC connected mode and provide the results of the measurements to the network;
   receive, from the network, an indication of triggering multicarrier connectivity, wherein at least one secondary cell to be utilized in the multicarrier connectivity are determined based on the provided results of the measurements;
   apply multicarrier connectivity for communication with the network after entering the RRC connected mode, wherein connecting to the at least one secondary cell is based on the indication and the configuration acquired before entering the RRC inactive mode.

9. The apparatus of claim 1, wherein the RRC connected mode is with a New Radio, NR, communication network and the apparatus is a user equipment operable at least in the NR communication network.

10. A method, the method comprising:
    acquiring from a network a configuration for at least one secondary cell;
    entering a radio resource control, RRC, inactive mode;
    maintaining at least part of the configuration during the inactive mode;
    determining, based on the configuration, which carriers are to be measured during the RRC inactive mode;
    performing measurements of the determined carriers during the RRC inactive mode;
    providing the results of the measurements to the network upon entering an RRC connected mode,
    wherein only a subset of the carriers indicated in the configuration are to be measured, and
    wherein the subset includes those carriers that were activated within a predetermined duration before the entering the RRC inactive mode.

11. The method of claim 10, further comprising:
    receiving a state transition message from the network, the message comprising information indicating the configuration.

12. The method of claim 10, further comprising:
entering the RRC connected mode and providing the results of the measurements to the network;
receiving, from the network, an indication of triggering multicarrier connectivity, wherein at least one secondary cell to be utilized in the multicarrier connectivity are determined based on the provided results of the measurements;
applying multicarrier connectivity for communication with the network after entering the RRC connected mode, wherein connecting to the at least one secondary cell is based on the indication and the configuration acquired before entering the RRC inactive mode.

13. An apparatus, comprising:
at least one processor and at least one memory including a computer program code, wherein the at least one memory and the computer program code are configured, with the at least one processor, to cause the apparatus to:
acquire from a network a configuration for at least one secondary cell;
enter a radio resource control, RRC, inactive mode;
maintain at least part of the configuration during the inactive mode;
determine, based on the configuration, which carriers are to be measured during the RRC inactive mode;
perform measurements of the determined carriers during the RRC inactive mode;
provide the results of the measurements to the network upon entering an RRC connected mode,
wherein the at least one memory and the computer program code are configured, with the at least one processor, to cause the apparatus further to:
acquire information of a validity duration indicating how long the determination of which carriers are to be measured during the RRC inactive mode is valid,
wherein the validity duration is indicated separately for each carrier that is to be measured, wherein at least two carriers to be measured have different validity durations.

* * * * *